US008195952B2

(12) United States Patent
Andreev et al.

(10) Patent No.: US 8,195,952 B2
(45) Date of Patent: Jun. 5, 2012

(54) SYSTEM AND METHOD OF FACILITATING THE IDENTIFICATION OF A COMPUTER ON A NETWORK

(75) Inventors: Dmitry Andreev, Port Chester, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/011,869

(22) Filed: Dec. 14, 2004

(65) Prior Publication Data

US 2006/0129831 A1 Jun. 15, 2006

(51) Int. Cl.
 *H04L 29/06* (2006.01)
(52) U.S. Cl. .............................. 713/183; 713/182; 726/2
(58) Field of Classification Search ................... 713/183
See application file for complete search history.

(56) References Cited

U.S. PATENT DOCUMENTS

| | | | |
|---|---|---|---|
| 6,151,628 A * | 11/2000 | Xu et al. ....................... 709/225 |
| 6,279,113 B1 | 8/2001 | Vaidya |
| 6,363,489 B1 | 3/2002 | Comay et al. |
| 6,513,122 B1 | 1/2003 | Magdych et al. |
| 6,564,326 B2 * | 5/2003 | Helbig, Sr. ....................... 726/34 |
| 6,735,691 B1 * | 5/2004 | Capps et al. ....................... 713/1 |
| 6,879,979 B2 * | 4/2005 | Hindawi et al. .................... 707/3 |
| 7,251,632 B1 * | 7/2007 | Ogg et al. ........................ 705/62 |
| 7,342,906 B1 * | 3/2008 | Calhoun ....................... 370/338 |
| 2001/0047407 A1 * | 11/2001 | Moore et al. .................. 709/223 |
| 2003/0056092 A1 | 3/2003 | Edgett et al. |
| 2003/0143990 A1 * | 7/2003 | Minear et al. .................. 455/418 |
| 2003/0196102 A1 * | 10/2003 | McCarroll ..................... 713/194 |
| 2004/0028001 A1 * | 2/2004 | Billhartz ........................ 370/312 |
| 2004/0030892 A1 | 2/2004 | Mengfu |
| 2004/0168083 A1 * | 8/2004 | Gasparini et al. ............. 713/201 |
| 2005/0055570 A1 * | 3/2005 | Kwan et al. ................... 713/201 |
| 2005/0132382 A1 * | 6/2005 | McGuire et al. ............... 719/311 |
| 2005/0216314 A1 * | 9/2005 | Secor ................................ 705/3 |
| 2005/0228874 A1 * | 10/2005 | Edgett et al. .................. 709/220 |

FOREIGN PATENT DOCUMENTS

JP 2000312211 A * 11/2000

OTHER PUBLICATIONS

Machine translation of JP 2000-312211.*

* cited by examiner

*Primary Examiner* — Edward Zee
*Assistant Examiner* — Yogesh Paliwal
(74) *Attorney, Agent, or Firm* — Anna Linne; Roberts Mlotkowski Safran & Cole, P.C.

(57) ABSTRACT

A system and method for facilitating identification of an attacking computer in a network is provided. A user attempting to login to a network application may be presented with a screen prior to the login which lists preconditions of gaining access to the application. If a user concurs with the preconditions, a security module is downloaded to the user's computer and executed which gathers various configuration settings and transmits the gathered information to a predetermined destination. The security module may also attempt to place a call to a predetermined destination over a modem in the computer to cause registration of caller-ID data when answered at the predetermined destination. Once the security check is completed, login may proceed with the network application. Any data gathered by the security module may be stored for later recall and use to identify the computer in the event of an attack.

26 Claims, 4 Drawing Sheets

SYSTEM AND METHOD OF FACILITATING THE IDENTIFICATION OF A COMPUTER ON A NETWORK

FIELD OF THE INVENTION

The invention generally relates to a system and method for identifying a computer that may be involved in an attack on a network application and, more particularly, to a system and method to accumulate identifying characteristics of a computer prior to a login to the network application.

BACKGROUND DESCRIPTION

The identification of a computer that has attacked a business or governmental network application may be of paramount importance for prevention of unauthorized attacks and for law enforcement purposes, if required. Computer attacks with intentions to access or destroy information, whether the information is secured or not, continues to be a major issue for computerized operations.

Controlling access to databases or services typically includes levels of password security or authentication procedures to exclude unauthorized access. However, even with these security measures, attacks are frequently successful. Once an attack has occurred, reconstructing information related to the intrusion may be then difficult, if not impossible.

In a situation when the attack may be aimed at gaining access to the system, as opposed to "denial of service" type of attack, identification of the attacker may be impeded by at least the following circumstances:

(i) the fact that immediately before attempting the attack, when the login screen is requested and displayed, the potential intruder may not be distinguished from the legitimate application user, and (ii) at the moment when the system may be able to classify the access attempt as being a possible attack, rather than a legitimate login, the attacker often has already been warned, e.g., by an "Invalid userID" or "Invalid Password" message. The attacker may be either gone or on a higher alert level, so it may be too late to take steps aimed at identifying the attacking computer.

Currently, capturing identifying information of a potential intruder, before or concurrent with a network access, does not exist. If such identifying information and specific connection related data were to be accumulated, stored and catalogued then a basis for reconstructing the identity of an attacker may be possible. Once identifying information has been captured, legal recourse may be more easily accomplished.

SUMMARY OF THE INVENTION

In an aspect of the invention, a method is provided for facilitating identification in a network. The method comprises the steps of processing a login to an application only after capturing configuration data of a computer performing the login, recalling the configuration data and matching at least portions of the recalled configuration data to corresponding portions of subsequent captured configuration data to establish whether the recalled configuration data and the subsequent captured configuration data are both derived from the computer.

In another aspect of the invention, a system for facilitating attacker identification in a network is provided. The system comprises at least one component to process a login to an application only after capturing configuration data of a computer performing the login, recall the configuration data and match at least portions of the recalled configuration data to corresponding portions of subsequent captured configuration data to establish whether the recalled configuration data and the subsequent captured configuration data are both derived from the computer.

In another aspect of the invention, a computer program product is provided comprising a computer usable medium having readable program code embodied in the medium, the computer program product includes at least one component to process a login to an application only after capturing configuration data of a computer performing the login, recall the configuration data and match at least portions of the recalled configuration data to corresponding portions of subsequent captured configuration data to establish whether the recalled configuration data and the subsequent captured configuration data are both derived from the computer.

DETAILED DESCRIPTION OF EMBODIMENTS OF THE INVENTION

This invention is directed to a system and method for capturing computer information prior to processing a login of a user to a network based application or system. Based on the captured information, recourse may be taken if any illicit activity during or after login is detected. The invention may provide increased security aspects for business applications which are regarded as being security sensitive. This may be analogous to security arrangements applicable to human visitors of high-security facilities, e.g., airports, where all the customers consent to bag and personal search as a condition of accessing the departure zone.

Figure 1:
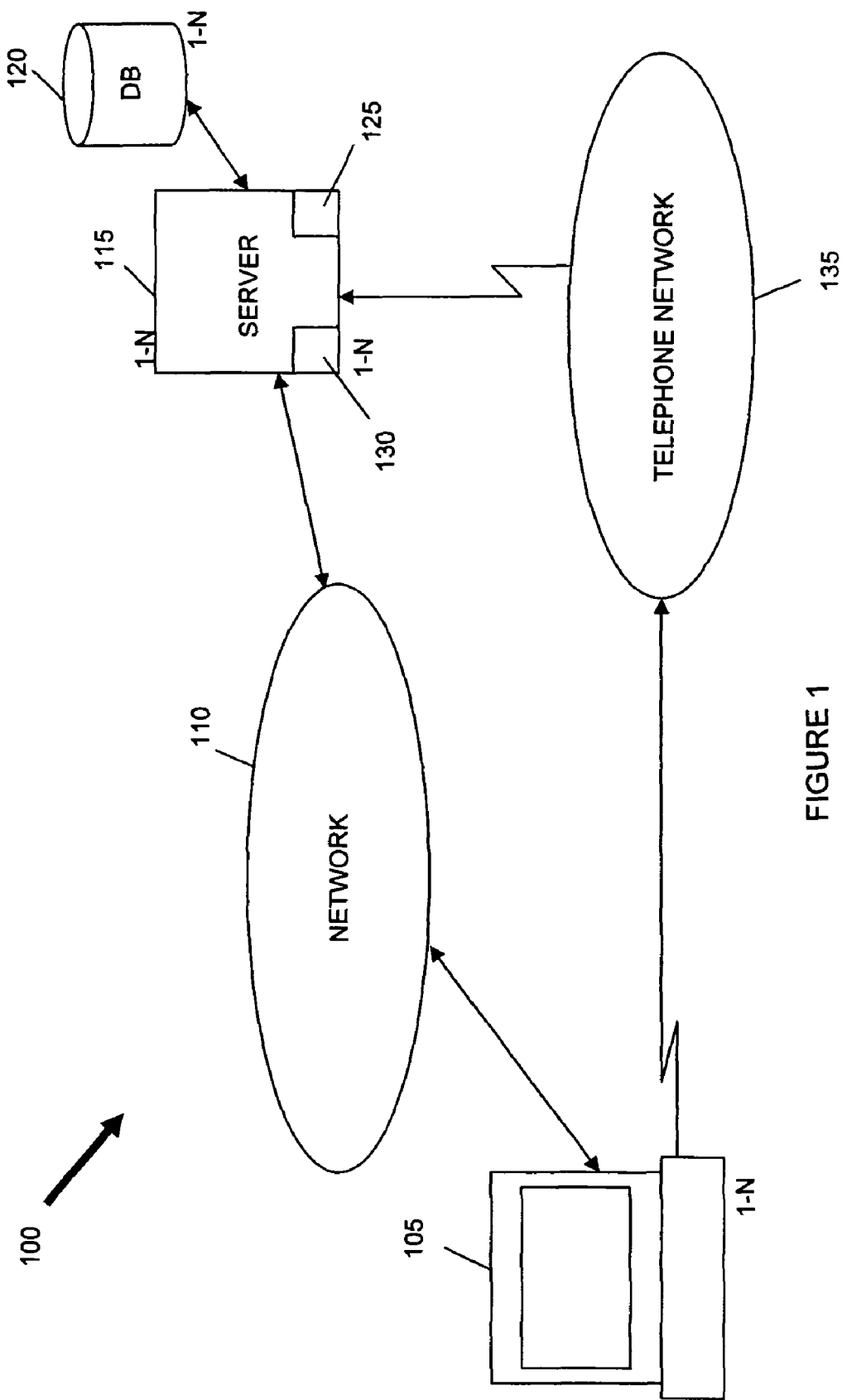
FIG. 1 is an illustrative embodiment of components of the invention.

FIG. 1 is an illustrative embodiment showing components of the invention, generally denoted by reference numeral 100. The components 100 include one or more computers or computing devices such as a personal computer (PC) 105 connected to network 110 which may be the Internet, wide-area network (LAN), or local area network (LAN). Optionally, a modem may be a part of the PC 105 which may be connected to a telephone network 135 for placing security calls to server 115. In embodiments, accordingly, there may be more than one server (i.e., 1-N) and more than one database (i.e., 1-N) in a wide range of configurations, perhaps using various modes of connectivity, as one of ordinary skill in the art would recognize.

The components 100 also include server 115 which may be more than one server (1-N) and represents a platform that serves one or more applications 130 to users. The applications may be of various types such as, for example, financial, ordering, searching, information retrieval, or the like. The server 115 may be in communication with the database 120, which may be more than one database (1-N), for storing applications and/or for storing information collected by components of the invention. Also included is a security module 125, generally known as "hostage.exe" which may also be resident, at least in part, on server 115 and which may be downloaded to the PC 105 and executed when the PC 105 accesses an application on the network 110. The security program 125 may store collected user information in database 120, or similar database. The security module is typically an executable module (e.g., compiled C program, or the like) capable of running on a client platform (e.g., WINDOWS®, LINUX®, or the like). Additionally, the applications and security module 125 may be served by different servers, as appropriate. As such, the components 100 are meant to be illustrative and not limited to any particular topology or configuration.

Further, the security module may take on various forms for use by networks, applications, or systems as appropriate for the specific environment of use, including browser operations. According to the system of method of the invention, the login screen may now be deferred, and instead, the network and/or application may now require the user at PC 105 to consent to downloading and running executable security module 125 (i.e., hostage.exe).

Figure 2:
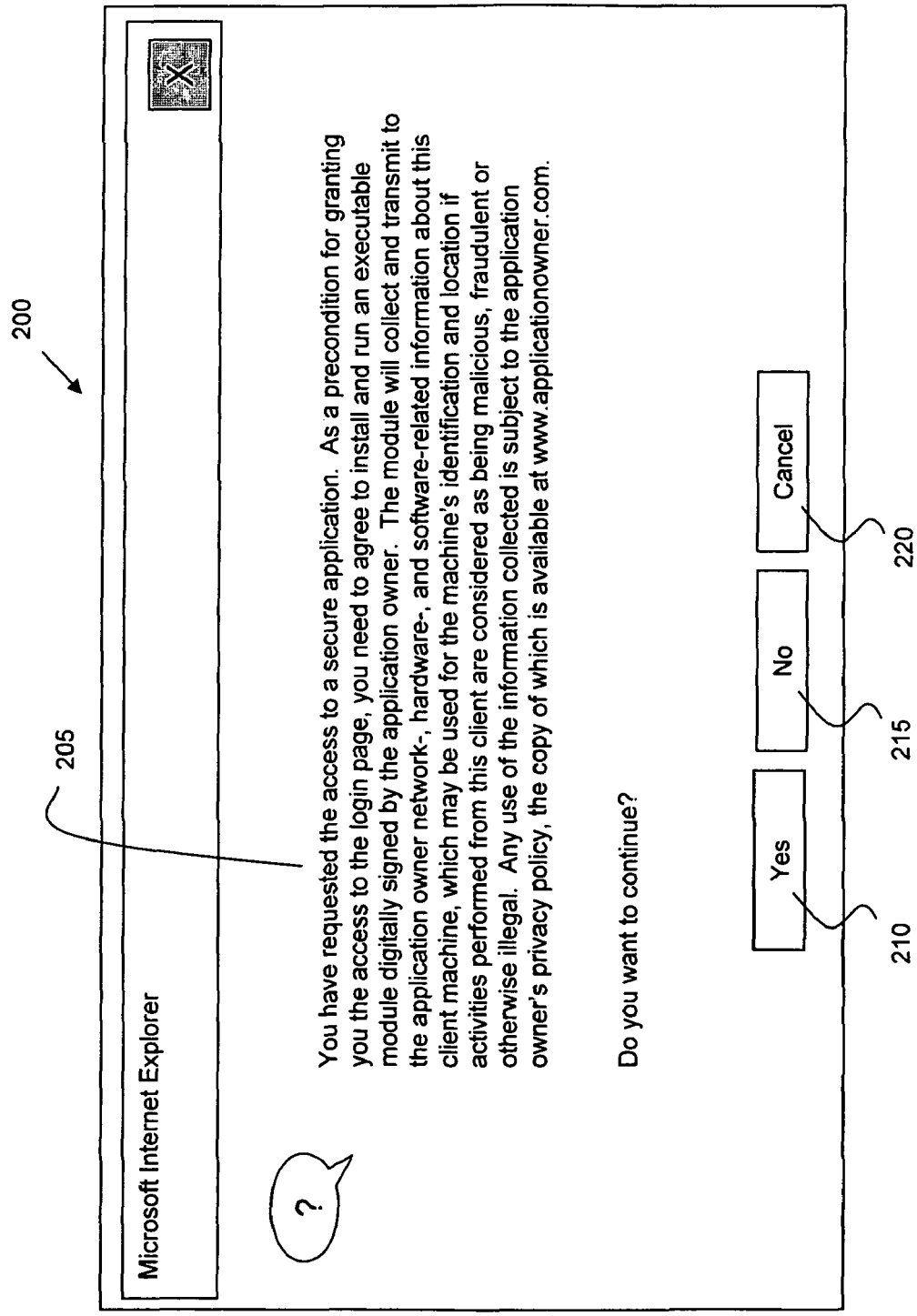
FIG. 2 is an illustration of an exemplary security graphical user interface (GUI) of the invention.

FIG. 2 is an illustration of an exemplary security graphical user interface (GUI) of the invention, generally denoted by reference numeral 200. The GUI 200 illustratively employs a MICROSOFT INTERNET EXPLORER™ browser which conveys precondition terms 205, or multiple sets of conditions, for granting access to the login page of an application. The precondition terms includes approval for running an executable module (i.e., hostage.exe) digitally signed by the application owner. The GUI 200 is meant to be illustrative; hence, any appropriate wording, in any language, which conveys the intent of the precondition terms and security process, may be used. If the user agrees by clicking the "Yes" button 210, hostage.exe collects various pieces of information which may include network, software or hardware related information, as described more fully below, for transmission to the application owner or agent. The user may also elect to choose the "No" button 215 or to simply cancel the operation by choosing the "Cancel" button 220. If either the "No" or "Cancel" button is chosen, the application does not provide a login screen, denying access to the application.

Legitimate users of a network application should not have any issues or concerns with approving the execution of the security module. Non-legitimate users may decline to proceed or choose to proceed with risk of detection.

Figure 3:
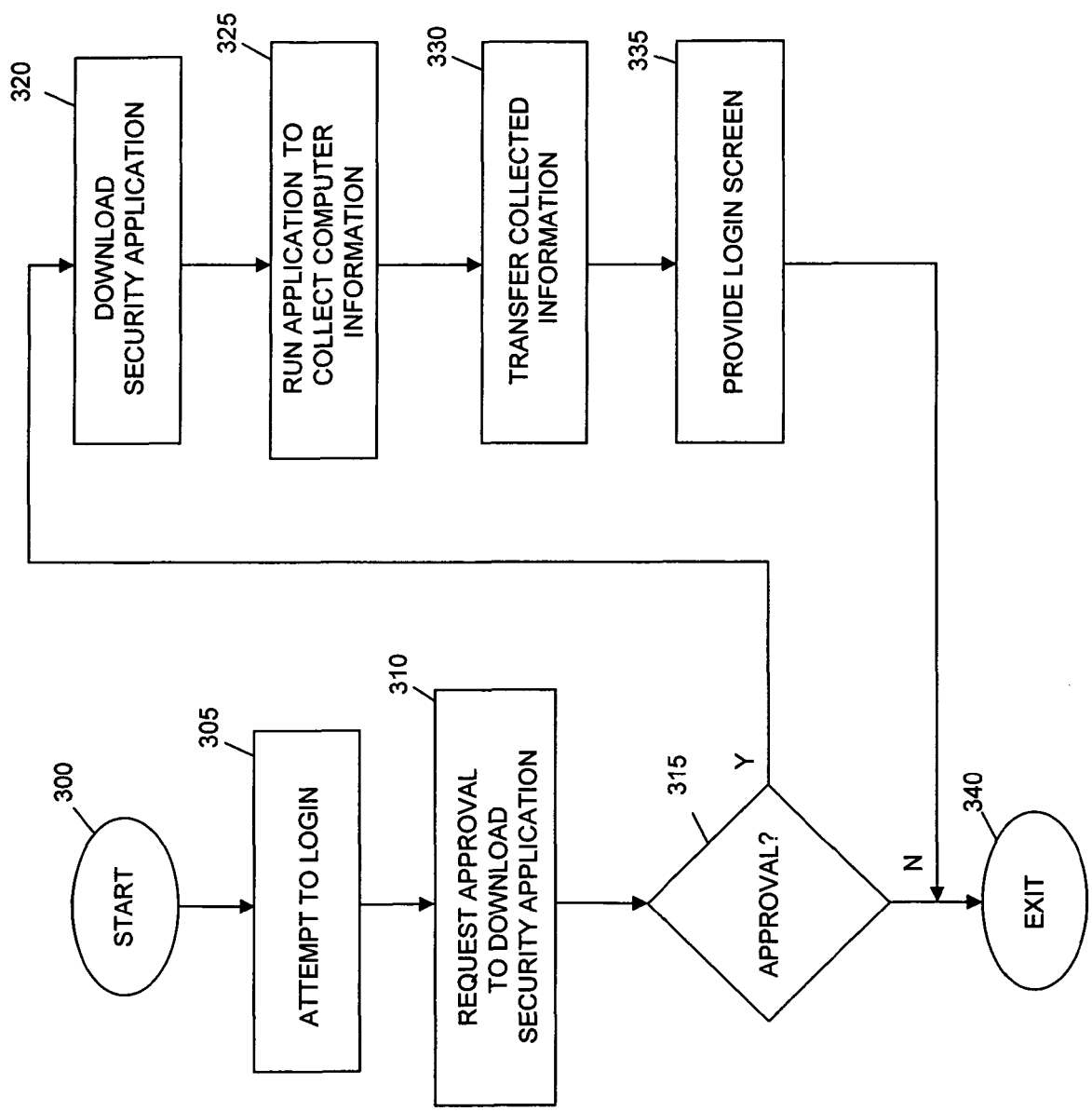
FIG. 3 is a flow diagram showing an embodiment of steps of using the invention.
Figure 4:
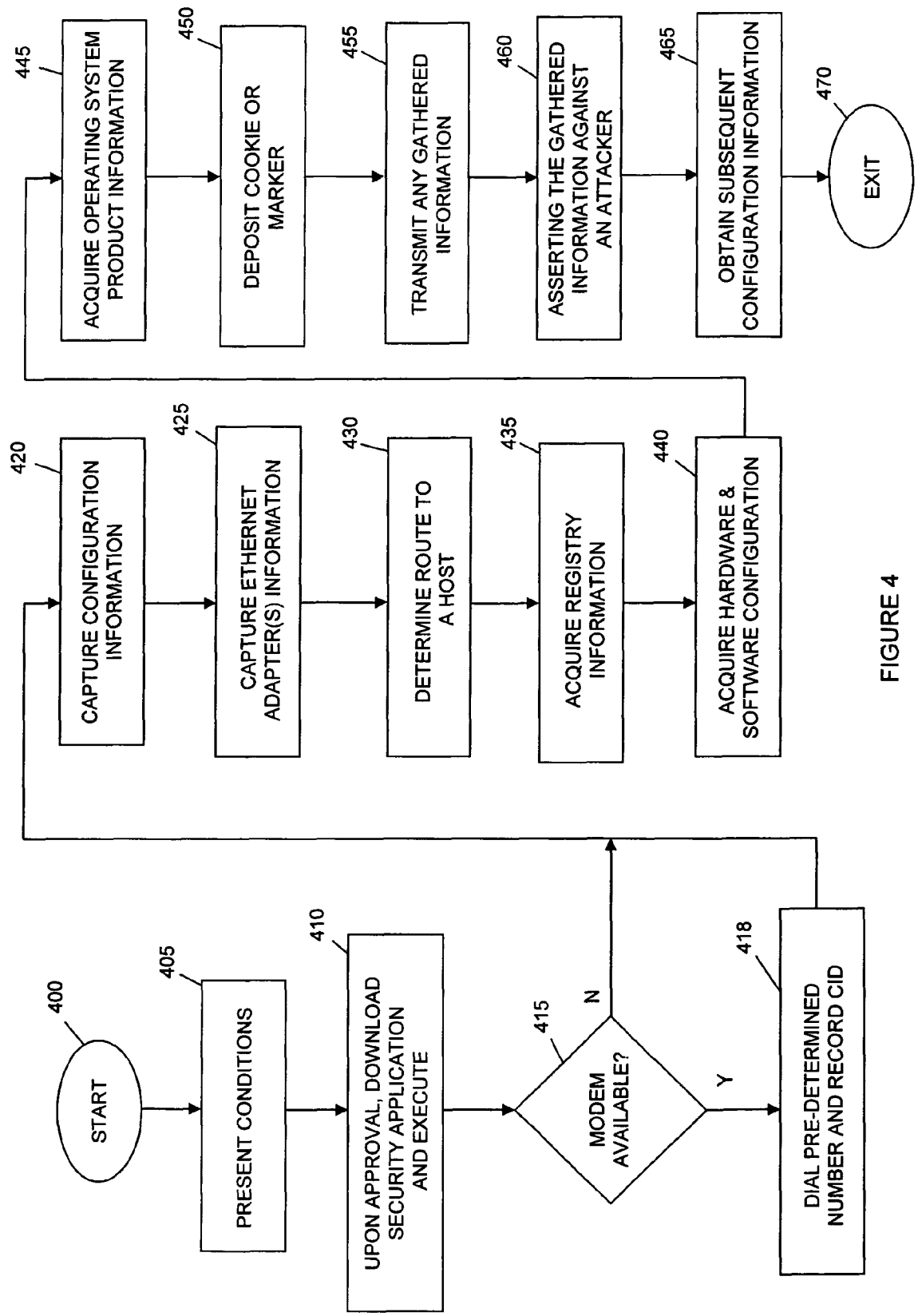
FIG. 4 is a flow diagram of an embodiment showing steps of using the invention.

FIG. 3 is a flow diagram showing an embodiment of steps of using the invention beginning at step 300. FIGS. 3 and 4 may equally represent a high-level block diagram of components of the invention implementing the steps thereof. The steps of FIGS. 3 and 4 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network Continuing with FIG. 3, at step 305, a user may attempt to login to a network application. At step 310, a prompt with preconditions may be presented to the user, perhaps as a GUI, that requests approval to download and execute a security application. At step 315, a check is made whether the approval has been provided by the user. If not, at step 340, the process ends without performing the security check or proceeding with the application login sequence. This effectively denies access to the application by the user.

If, however, approval is received, then at step 320, the security application may be downloaded from a network server to the user's computer. At step 325, the security application executes and collects various attributes that may be associated with the computer. These attributes, when assessed as a composite, may provide a unique description of the user's computer. Often, no two computers have exactly the same attributes or configurations. This configuration information may include any readable or detectable setting, device, assignment, version, component or data element that may be present or associated with the computer. This may also include hardware and software configurations available from the operating system registry, e.g., WINDOWS® Registry which may, for example, include information from HARDWARE, SOFTWARE and SYSTEM subtrees under HKEY_LOCAL_MACHINE. Also, operating system IDs such as WINDOWS® product ID from the Registry: HKEY-LOCAL_MACHINE-SOFTWARE-Microsoft-Windows-Product ID may also be collected. Also collected may be any of the following WINDOWS® IP configuration data for the computer as return by, for example, "ipconfig/all command": [0024] (i) Host name, [0025] (ii) Primary directory name service (DNS) suffix, and [0026] (iii) for every Ethernet adapter in the computer: [0027] Any connection-specific DNS suffix, [0028] Any description of the adapter, [0029] Any physical Address of the adapter, [0030] Any IP address of the adapter, [0031] Any subnet mask assigned to the adapter, [0032] Any default gateway assigned to the adapter, [0033] Any Dynamic Host Configuration Protocol DHCP Server(s) assigned to the adapter, and [0034] Any Directory Number Service (DNS) Server(s) assigned to the adapter.

At step 330, the collected information may be returned to the application server or other designated destination for cataloging and storage in a database with a date stamp of the security check. At step 335, once the computer information has been collected, a login screen may be presented to the user to proceed with typical login procedures (e.g., userID and password authentication) for the requested application.

FIG. 4 is a flow diagram of an embodiment showing steps of using the invention, beginning at step 400. At step 405, a screen presenting terms and conditions of gaining access to an application may be presented to a user. The conditions may stipulate that certain attributes and configurations of the user's computer may be acquired and sent to the application's owner or representative. The conditions, when accepted, establish an agreement between the user of the computer and the application owner or agent that the user's computer may be searched and information gathered and maintained concerning the configuration of the user's computer. At step 410, upon agreement or approval of the terms and conditions, a security application module may be downloaded and executed at the user's computer. The security module executes and gathers configuration information of various types that may be present in or associated with the user's computer for establishing a "computer-print" (analogous to a fingerprint to identify a person). This configuration information, when captured and stored, may be subsequently used, when necessary, to assist in proving or demonstrating that this particular computer was likely to have been involved in a certain activity (e.g., an attack on another system/application or performed some other action) during a particular time period.

At step 415, a check may be made as to whether a modem is configured on the user's computer. If so, then at step 418, the security module attempts to dial a pre-determined number, for example "800," "877," "866," "900," or other pre-determined number. When the call is successfully placed and answered at a corresponding security call reception application also provided by the invention, such as an application running on server 115 or other location as determined by the application service provider, any received caller-ID information (i.e., as commonly provided by the telephone network to the called party) associated with the telephone line used by the modem in computer 105, is associated with the security module instance running at the user computer 105 and stored. This caller-ID reference information is correlated, time stamped and stored for later retrieval, as necessary. This caller-ID information may typically provide physical location information (e.g., from records of the telephone company) of the user's computer 105. If the modem call is successful or if the modem call cannot be established, processing continues with step 420.

If, however, there is no modem, or the call is successfully placed, then at step 420, the user's computer configuration information may be captured for composing a "computer-print" of the user's computer for later identification of the computer, if necessary. This configuration information may include, for example, any Host information and/or primary DNS information which may reflect assignments (potentially unique at least to a certain degree) that this computer may have. At step 425, configuration and parameter information associated with every Ethernet adapter may be captured as part of the configuration information. This may include for each Ethernet adapter any assigned connection-specific DNS suffixes, physical addresses, subnet masks, gateway defaults, DHCP and DNS servers, or the like.

At step 430, a route to a host on the Internet may be captured as part of the configuration information. Route data may provide, at least to a certain degree, unique identification of the user's computer. For example, if it can be demonstrated that the route data captured during a security check is the same route information of a computer involved in a later investigation, then it may be possible to establish that the same computer was involved in both situations.

Further, any IP addresses, such as returned by a tracert-d command, may be captured as part of the configuration information and may include addresses to routers and/or addresses that may be within private IP ranges (e.g., 10.0.0.1; 192.168.1.1; or 172.16.1.1). This IP address information may be in use by an enterprise or other Internet Service Providers (ISP) and may provide additional unique configuration information regarding the user's network topology.

At step 435, registry information on the user's computer may be acquired such as WINDOWS® Registry and SYSTEM subtrees (e.g., under HKey_Local_machine) to be included as part of the configuration information. At step 440, any hardware (e.g., central processing unit (CPU), disk, compact disk (CD), DVD, memory, modem, I/O, hardware element versions, or the like) or peripherals and software configurations (e.g., applications, drivers, browsers, directory structure, versions of software components, or the like) may be captured for inclusion in the configuration information, including any version information or manufacturer's ID. At step 445, information related to operating system product information and associated libraries may be captured as part of the configuration information.

At step 450, the security module may create and store on the user's computer a "cookie" or similar marker to record the date and time of the security scrutiny process. The cookie may be uniquely created for identifying a particular security check episode, and may include a digital signature of the application owner launching the security check. At step 455, the gathered security information (e.g. configuration information) may be encrypted, and optionally digitally signed with a signature of the application owner and transmitted to a server, application, or proxy application for possible correlation with any modem generated data. and cataloging for later recall if an attack subsequently occurs.

At optional step 460, the gathered security information (i.e., configuration information) may be retrieved and correlated to an attack incident (or other similar incident) and asserted against a possible attacker, as appropriate. At step 465, a subsequent security check may be performed on a suspect computer to obtain subsequent configuration data in order to match the retrieved information (i.e., information previously stored by an earlier security check) with the subsequent gathered configuration information data to establish a correlation and probability that the two sets of configuration data are derived from the same computer. This may involve matching corresponding portions of the configuration data from the two sets of data. A higher degree of confidence may be achieved as more portions of the two sets of data are matched, indicating that the two sets of data are likely from the same computer. This evidence may be used as necessary to enforce legal rights, or the like. The process exits at step 470.

While the invention has been described in terms of embodiments, those skilled in the art will recognize that the invention can be practiced with modifications and in the spirit and scope of the appended claims.

What is claimed is:

1. A method of facilitating identification in a network, comprising the steps of:
   processing a login to an application only after capturing a plurality of configuration data of a computer performing the login;
   recalling the plurality of configuration data from a memory; and
   matching at least portions of the recalled plurality of configuration data to corresponding portions of subsequent captured configuration data of a suspect computer which is a possible attacker of the network, to establish whether the recalled plurality of configuration data and the subsequent captured configuration data are both derived from the computer, wherein when the matching occurs, the computer is verified as possibly attacking the network and, wherein the plurality of configuration data comprises at least:
   (i) computer configuration information;
   (ii) Ethernet information associated with one or more Ethernet adapters;
   (iii) registry information;
   (iv) hardware configuration information;
   (v) software configuration information comprising a software component identification, a browser configuration, a software component version, a driver version, an application identification and directory structure; and
   (vi) operating system product information and associated libraries.

2. The method of claim 1, further comprising the steps of:
   receiving an approval of at least one condition;
   downloading a security module to the computer based on receiving the approval; and
   executing the security module on the computer to gather the configuration data.

3. The method of claim 1, further comprising the steps of:
   transmitting the configuration data to a server for storing; and
   providing a login screen for logging into the application after capturing the configuration data.

4. The method of claim 1, further comprising capturing the subsequent captured configuration data from a suspect computer for use in determining whether the suspect computer and the computer are the same computer.

5. The method of claim 1, wherein an attempt to login is one of a successful login and an unsuccessful login.

6. The method of claim 1, further comprising the steps of:
dialing a call to a predetermined number using a modem associated with the computer;
capturing caller identification (caller-ID) information associated with the call; and
correlating the caller-ID information with the configuration data for use in establishing an identity of the computer.

7. The method of claim 1, further comprising the steps of:
providing at least one condition prior to an attempt to login to the application;
capturing the plurality of configuration data of the computer after receiving and displaying the at least one condition; and
storing the plurality of configuration data of the computer for subsequent recall when required to identify the computer attempting the login.

8. The method of claim 7, wherein the capturing step further includes at least any one of:
determining a route to a host server; and
acquiring software configuration information.

9. The method of claim 8, wherein the computer configuration information includes at least any one of a host name and a primary directory name service (DNS) suffix.

10. The method of claim 8, wherein the acquiring registry information step includes acquiring configurations from hardware, software and system subtrees.

11. The method of claim 8, wherein the acquiring hardware configuration step acquires hardware information for at least any one of a central processing unit (CPU), memory, a compact disk, a DVD, a modem, hardware element version, and an I/O port, and wherein the acquiring software configuration step acquires at least any one of a software component identification, a browser configuration, a software component version, a driver version, an application identification and directory structure.

12. The method of claim 1, further comprising depositing a marker on the computer to mark that an instance of a security check has occurred.

13. The method of claim 1, further comprising the step of accessing a stored configuration data when an incident has been identified requiring identification of the computer.

14. The method of claim 1, wherein the plurality of configuration data uniquely identify the computer performing the login.

15. The method of claim 1, wherein the matching is performed upon an attack received from a computer.

16. The method of claim 1, further comprising the steps of:
receiving an approval of at least one condition;
downloading a security module to the computer based on receiving the approval; and
executing the security module on the computer to gather the configuration data, and wherein:
the plurality of configuration data uniquely identify the computer performing the login; and
the matching is performed upon an attack received from a computer.

17. A method of facilitating identification in a network, comprising the steps of:
processing a login to an application only after capturing a plurality of configuration data of a computer performing the login;
recalling the plurality of configuration data from a memory;
matching at least portions of the recalled plurality of configuration data to corresponding portions of subsequent captured configuration data of a suspect computer which is a possible attacker of the network, to establish whether the recalled plurality of configuration data and the subsequent captured configuration data are both derived from the computer, wherein when the matching occurs, the computer is verified as possibly attacking the network, and wherein the plurality of configuration data comprises at least:
(i) computer configuration information;
(ii) Ethernet information associated with one or more Ethernet adapters;
(iii) registry information; and
(iv) hardware configuration information;
providing at least one condition prior to an attempt to login to the application;
capturing the plurality of configuration data of the computer after receiving and displaying the at least one condition; and
storing the plurality of configuration data of the computer for subsequent recall when required to identify the computer attempting the login,
wherein the capturing step further includes at least any one of:
determining a route to a host server; and
acquiring software configuration information, and
wherein the Ethernet information includes:
(i) a connection-specific DNS suffix,
(ii) description of any Ethernet connection,
(iii) a physical address of any Ethernet adapter,
(iv) an Internet Protocol (IP) address of any Ethernet adapter,
(v) a subnet mask assigned to any Ethernet adapter,
(vi) a default gateway assigned to any Ethernet adapter,
(vii) a DNS server assigned to any Ethernet adapter, and
(viii) a dynamic host configuration protocol (DHCP) server assigned to any Ethernet adapter.

18. A system for facilitating attacker identification in a network, comprising at least one processor to:
process a login to an application only after capturing a plurality of configuration data of a computer performing the login;
recall the plurality of configuration data;
match at least portions of the recalled plurality of configuration data to corresponding portions of subsequent captured configuration data of a suspect computer which is a possible attacker of the network, to establish whether the recalled plurality of configuration data and the subsequent captured configuration data are both derived from the computer, wherein when the matching occurs, the computer is verified as possibly attacking the network; and
provide a security module to the computer based on receiving an approval of at least one condition, which executes on the computer to gather and send the plurality of configuration data, wherein the plurality of configuration data comprises:
(i) computer configuration information;
(ii) Ethernet information associated with one or more Ethernet adapters;
(iii) registry information; and (iv) hardware configuration information,
wherein the security module further performs at least any one of:
　determining a route to a host server; and
　acquiring software configuration information, and
wherein the computer configuration data includes at least any one of a host name and a primary directory name service (DNS) suffix and wherein the Ethernet information includes:
　(i) a connection-specific DNS suffix,
　(ii) a description of any Ethernet connection,
　(iii) a physical address of any Ethernet adapter,
　(iv) an Internet Protocol (IP) address of any Ethernet adapter,
　(v) a subnet mask assigned to any Ethernet adapter,
　(vi) a default gateway assigned to any Ethernet adapter,
　(vii) a DNS server assigned to any Ethernet adapter, and
　(viii) a dynamic host configuration protocol (DHCP) server assigned to any Ethernet adapter.

19. The system of claim 18, further comprising the at least one component to:
　transmit the configuration data to a server for the storing; and
　provide a login screen for logging into the application after capturing the configuration data.

20. The system of claim 18, further comprising the at least one component to:
　dial a call to a predetermined number using a modem associated with the computer;
　capture caller identification (caller-ID) of the originator of the call; and
　correlate the caller-ID information with the configuration data for use in establishing the identity of the computer.

21. The system of claim 18, further comprising the at least one component to:
　acquire configurations from hardware, software and system subtrees;
　acquire hardware information for at least any one of a central processing unit (CPU), memory, a compact disk, a DVD, a modem, hardware element version, and an I/O port; and
　acquire at least any one of a software component identification, a browser configuration, a software component version, a driver version, an application identification and directory structure.

22. The system of claim 18, further comprising the at least one component to deposit a marker on the computer to mark that an instance of capturing the plurality of configuration data has occurred and to access the stored plurality of configuration data when an attack incident has been identified for identifying the computer.

23. The system of claim 18, wherein the security module is digitally signed by an application owner and downloaded to the computer to capture the configuration data.

24. The system of claim 23, wherein the configuration data is digitally signed by an application owner.

25. A computer program product comprising a tangible computer storage memory device having readable program code embodied in the tangible storage memory device, the computer program product includes at least one component to:
　process a login to an application only after capturing a plurality of configuration data of a computer performing the login;
　recall the plurality of configuration data;
　match at least portions of the recalled plurality of configuration data to corresponding portions of subsequent captured configuration data of a suspect computer which is a possible attacker of a network, to establish whether the recalled plurality of configuration data and the subsequent captured configuration data are both derived from the computer, wherein when the matching occurs, the computer is verified as possibly attacking the network; and
　provide a security module to the computer based on receiving an approval of at least one condition, which executes on the computer to gather and send the plurality of configuration data, the plurality of configuration data comprises:
　　(i) computer configuration information;
　　(ii) Ethernet information associated with one or more Ethernet adapters;
　　(iii) registry information;
　　(iv) hardware configuration information;
　　(v) software configuration information comprising a software component identification, a browser configuration, a software component version, a driver version, an application identification and directory structure; and
　　(vi) operating system product information and associated libraries.

26. The method of claim 18, wherein the plurality of configuration data further comprises:
　(vii) a route to a host server; and
　(viii) software configuration information.

\* \* \* \* \*